(12) United States Patent
Norheim

(10) Patent No.: US 6,510,788 B1
(45) Date of Patent: Jan. 28, 2003

(54) DEVICE AND METHOD FOR APPLICATION OF COATING POWDER

(75) Inventor: Egil Norheim, Kungsbacka (SE)

(73) Assignee: Perma Press AB, Kungsbacka (SE)

( * ) Notice: Subject to any disclaimer, the term of this patent is extended or adjusted under 35 U.S.C. 154(b) by 0 days.

(21) Appl. No.: 09/579,539

(22) Filed: May 26, 2000

(51) Int. Cl.[7] .................. B05B 7/00; B05C 19/04; B05C 19/06
(52) U.S. Cl. .................. 101/114; 118/308; 118/63; 118/46; 454/50; 454/53
(58) Field of Search .................. 101/424.1, 114; 400/635; 118/308, 46, 63, 301; 55/320, 430; 454/50, 51, 52, 53, 56, 57, 60

(56) References Cited

U.S. PATENT DOCUMENTS

| | | | | |
|---|---|---|---|---|
| 3,918,641 A | * | 11/1975 | Lehmann et al. | 118/620 |
| 4,543,274 A | * | 9/1985 | Mulder | 427/197 |
| 4,723,505 A | * | 2/1988 | Wilson et al. | 118/326 |
| 4,991,539 A | * | 2/1991 | Sarda | 118/668 |
| 5,146,868 A | * | 9/1992 | Kirk | 118/713 |
| 5,967,510 A | * | 10/1999 | Ono et al. | 271/196 |
| 6,425,334 B1 | * | 7/2002 | Strahm et al. | 118/620 |

FOREIGN PATENT DOCUMENTS

| | | | | |
|---|---|---|---|---|
| CH | 617871 A | * | 6/1980 | B05B/5/02 |
| JP | 61038653 A | * | 2/1986 | B05B/15/12 |

* cited by examiner

Primary Examiner—Daniel J. Colilla
(74) Attorney, Agent, or Firm—Burns, Doane, Swecker & Mathis, LLP

(57) ABSTRACT

A device for application of coating powder in a process including a conveyor with an air permeable conveyor surface for conveying a base sheet in a direction of travel, wherein the base sheet is coated with at least one layer upstream of the conveyor, and a powder-applying device, arranged to apply coating powder onto the base sheet. A device for directing a jet of air towards the base sheet is also arranged downstream of the powder applying device such that the jet of air effectively removes any excess coating powder from the base sheet. A suction device is also arranged to create an under-pressure beneath the conveyor surface, causing the base sheet to be pulled towards the conveyor surface, and forcing the excess coating powder to pass through the conveyor surface.

16 Claims, 4 Drawing Sheets

DEVICE AND METHOD FOR APPLICATION OF COATING POWDER

TECHNICAL FIELD OF THE INVENTION

The present invention relates to a device and a method for application of coating powder in a screen or offset printing process. In particular, the invention relates to a device and a method for application of adhesive powder in a screen transfer printing process.

TECHNICAL BACKGROUND

A conventional screen printing process includes applying one or more layers of color to an object, by pressing it through the mesh of a netting screen stretched on a frame, onto the object. A screen transfer printing process relates to producing a screen printed material (hereafter referred to as a screen transfer) that can be heat transferred to e.g. a garment. The material normally consists of several layers of colored ink having been applied to at least an area of a base sheet, i.e. a sheet of paper or cardboard. The coated area is then pulled of the sheet, and is ready to be attached to a garment or any other object of suitable material. In order to be readily attachable, an adhesive powder is applied onto the coated area after the final layer of ink has been applied. This adhesive can be adapted to be heat or pressure activated, and therefore makes it possible to attach the transfer in a simple manner. Other ways of activating the adhesive include microwave energy.

In other printing operations, for example offset printing of Christmas cards, a printed area is often coated with different types of powders, for example a glittery powder to resemble snow.

According to one technique, the application of coating powder is accomplished by dipping the screen or offset printed sheet in powder and then shaking off excess powder. This process is commonly referred to as "dip'n'shake".

In other conventional devices, the powder is applied and excess removed in an automatic process. First the powder is applied in excess directly on the sheet, situated on a conveyor, i.e. a belt conveyor. Then, the removal of excess powder is provided through a suction device, working as a vacuum cleaner to remove powder not sticking to the coated area. In order to prevent the base sheet from leaving the conveyer and being pulled towards the suction device, a series of bars provided with rollers are arranged to extend across the conveyor. These rollers hold the sheet down as it passes under the suction device.

However, as it is necessary that the rollers make physical contact with the sheet, they also affect the coating process. At least two problems are prevalent: firstly the rollers risk damaging the colored layers that previously have been applied to the base sheet, by applying a too strong force to the sheet. Secondly, powder particles that are captured underneath the rollers are not subjected to the same suction force as the adjacent powder particles, and will therefore be removed to a lesser extent. Additionally, these powder particles will be pushed into and buried in the color coating.

These factors result in an uneven application of powder, typically with a striped pattern from the rollers.

Another problem with the above application technique, is that the final colored layer must not be too wet. Wet ink would stick to the rollers and cause stripes of ink over the entire sheet. After the final colored coating is applied, the sheet must therefore be allowed to dry, taking up valuable time and delaying the process.

Normally, a PVC-based or plastisole ink or is used, which first is allowed to dry and then is reheated and partially melted, in order to be sufficiently tacky for the powder particles to stick to the surface. A water-based ink is difficult to use, as such ink either is wet or dry, and only with difficulty can be made to reach such a tacky condition.

SUMMARY OF THE INVENTION

The overall object of the present invention is to provide an application of coating powder in a screen or offset printing process, overcoming the above-mentioned problems.

A specific object of the present invention is to assure a satisfying application of adhesive powder in a screen transfer printing process.

A further object of the present invention is to allow for use of water-based ink in a screen transfer printing process.

Yet another object of the present invention is to avoid the need of rollers retaining a sheet to be coated onto a conveyor.

These and other objects are accomplished by a device according to claim 1 and by a method according to claim 7.

The main feature of the device and the method according to the invention is that a jet of air is used as an air-knife, in order to remove excess powder from the base sheet. As the sheet is kept in close contact with the conveyor by suction, the sheet itself is essentially not moved at all by the air jet.

The two air flows being used, namely the suction of the base sheet towards the conveyor, and the air jet directed towards the sheet surface, may be arranged to cooperate and be connected in a cycle. The same powering device, e.g. a fan, can then be used to power the suction and the air-knife.

As suction is provided beneath the base sheet, the excess powder removed by the air-knife may readily be collected with the aid of this suction. The powder so collected may be transported back to the powder-applying device and be reused.

DESCRIPTION OF A PREFERRED EMBODIMENT OF THE INVENTION

Figure 1:
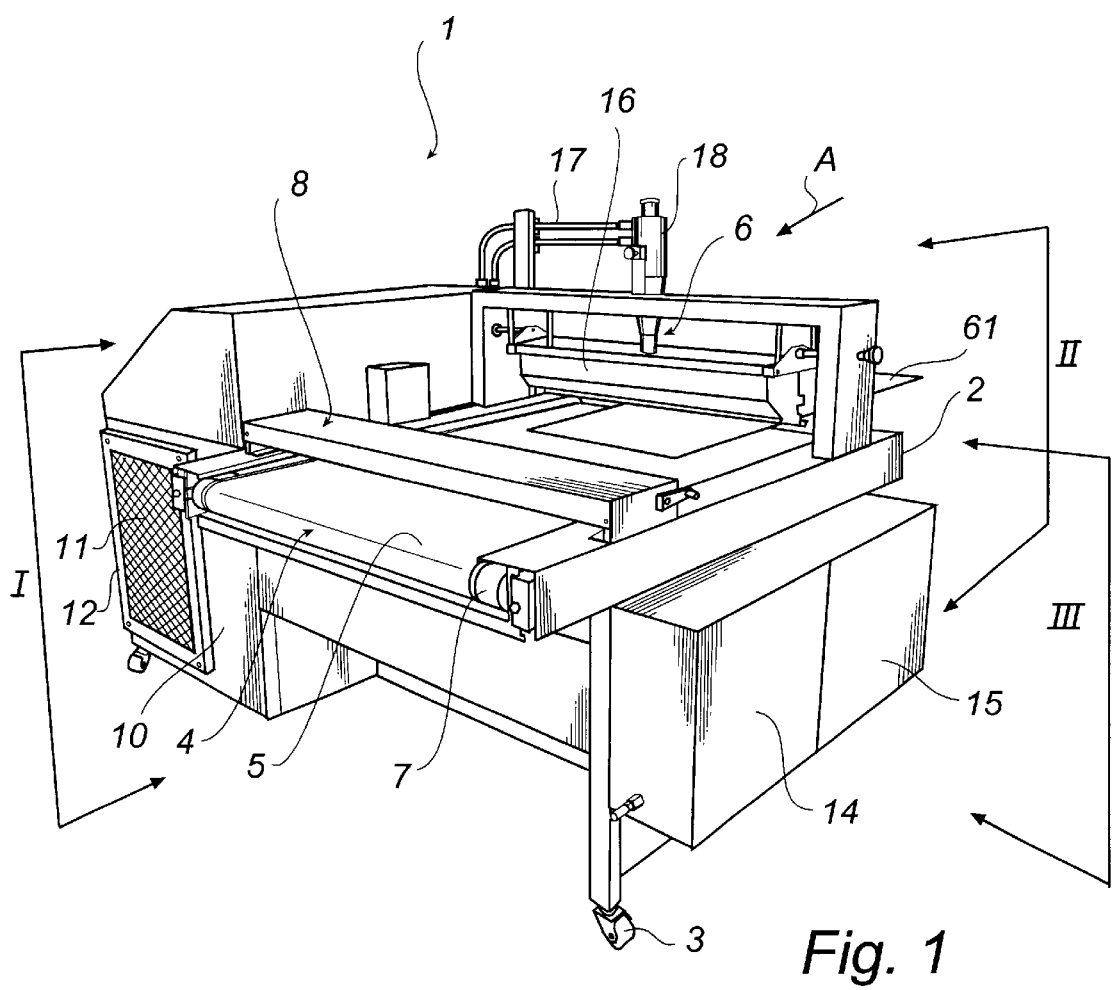
FIG. 1 is a perspective view of a machine incorporating a device according to the present invention.

The machine shown in FIG. 1 is intended to be part of a screen transfer printing line, placed downstream the screen printing process itself. Preferably, the machine is located immediately after the printing process.

Base sheets, normally made of a release coated paper or plastic material, are transported along the screen transfer line, passing different process steps, including the screen printing step, the adhesive powder application step and a drying/curing step. The sheets are transported on a moving conveyor between the steps.

Figure 6:
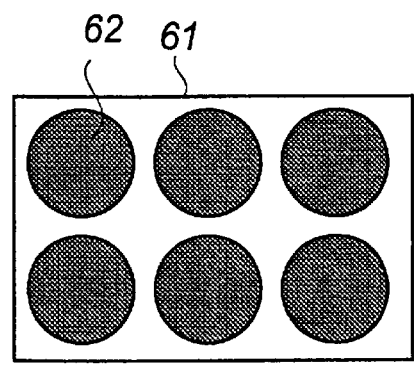
FIG. 6 is an example of a base sheet with transfers printed thereon.

In the printing step, the base sheet is coated with a screen print ink, consisting of a screen print base to which colored pigmentation has been added. Depending on the specific application, each sheet can support one or several transfers. In a typical case, shown in FIG. 6, the base sheet 61 has dimensions corresponding to the conveyer width, whereas the transfers 62 are smaller, as they are intended to be attached to e.g. a garment. Therefore, normally several (in the illustrated case six) transfers 62 are printed onto each base sheet 61.

According to a different technique, the base sheet is in fact a continuous run, carried by the conveyor from one roll to another. In this case, the transfers are printed on the run, and then rolled up on the second roll together with the run. This can be an advantage when several different colors of ink are to be printed, as the rolls can be switched and the run can be carried by the conveyer back to the first roll.

The screen ink is traditionally PVC-based, but the present invention is equally applicable with water-based ink, which is one of the advantages over prior art.

In many cases, the screen transfer is a multi-color print, demanding a multiple printing process. One way of accomplishing this is to let the base sheet pass along the mentioned printing line several times, each time applying a different colored layer of ink. If different areas of the screen transfer in this way are printed one after the other, each area is dried before the next color is applied. The final ink layer, normally being a pale shade such as white, or transparent, is however applied all over each transfer, so that the entire surface of each transfer is covered with wet, paint. Thus, when a base sheet with one or several transfers printed thereon is conveyed to the machine according to the invention, the surface of each transfer is still tacky.

Returning now to FIG. 1, the machine 1 comprises a rigid structure 2 preferably made of welded steel profiles, supporting the different elements of the machine. In the illustrated example the structure is supported by wheels 3, making it easily movable. A belt conveyor 4 is arranged substantially in the horizontal plane, comprising a belt 5 of a flexible and permeable material, preferably a net 5 or the like, supported by two bars 7, extending across the width of the machine. Below the conveyor an under-pressure is provided by a suction device (not visible in FIG. 1 but in FIG. 2). Above the conveyor is arranged a powder-applying device 6 and an air-knife device 8, i.e. a device for providing a jet of air directed towards the upper surface of the conveyor 4.

To one side of the machine 1 is a housing 10, wherein the suction device, e.g. a fan, is situated. The housing 10 has an outlet 11, fitted with a silencer and an outlet filter covered by a steel net cover 12 or the like.

To the other side of the machine 1 are control boxes 14, 15 for electricity and air.

The powder-applying device in the illustrated example includes a hopper 16, being filled with adhesive powder which is distributed through an opening down onto the base sheet and any transfers thereon. The hopper can be arranged to vibrate, preferably in a direction transverse to the direction of travel A of the conveyor, thereby ensuring a satisfactory distribution of powder onto the base sheet. The details of this vibration arrangement will be disclosed below in connection to FIG. 4.

A powder supply line 17 is arranged to recirculate excess adhesive that has been removed from the base sheet. In order to improve the powder application process, and to achieve a regular distribution of powder into the hopper, the supply line can be connected to a so called cyclone 18, where the powder is brought to circulate in a spiral shaped path towards the hopper 16.

Figure 5:
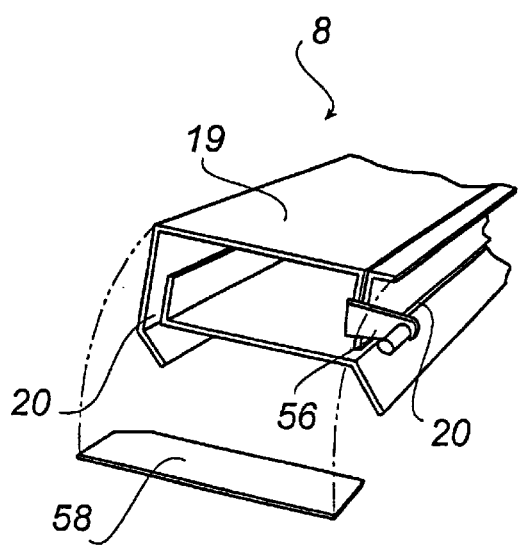
FIG. 5 is a perspective view of the air-knife device of the machine in FIG. 1.

Continuing now to the air-knife device 8, this is constituted by a box 19 that is connected to the overpressure prevailing in the suction device housing. In the illustrated case, the box 19 is simply formed as an extension of the housing 10, and extends across the complete width of the conveyor 4. The box 19 is schematically shown in FIG. 5, where the side 58 has been removed in order to better illustrate the construction of the box 19. The box 19 is along one or two sides provided with a slit 20, through which the air can pass. The opening of one or both slits can be adjusted my means of a lever 56, readily accessible by an operator of the machine, in order to adjust the jet of air directed towards the conveyor 4.

Even though the illustrated air-knife extends straight across the conveyor, a box 19 can have the shape of a plough bill, in order to bring the excess powder towards the sides of the conveyor. This is especially preferred in the above mentioned case when the base sheet consists of a continuous run carried between two rolls.

Figure 2:
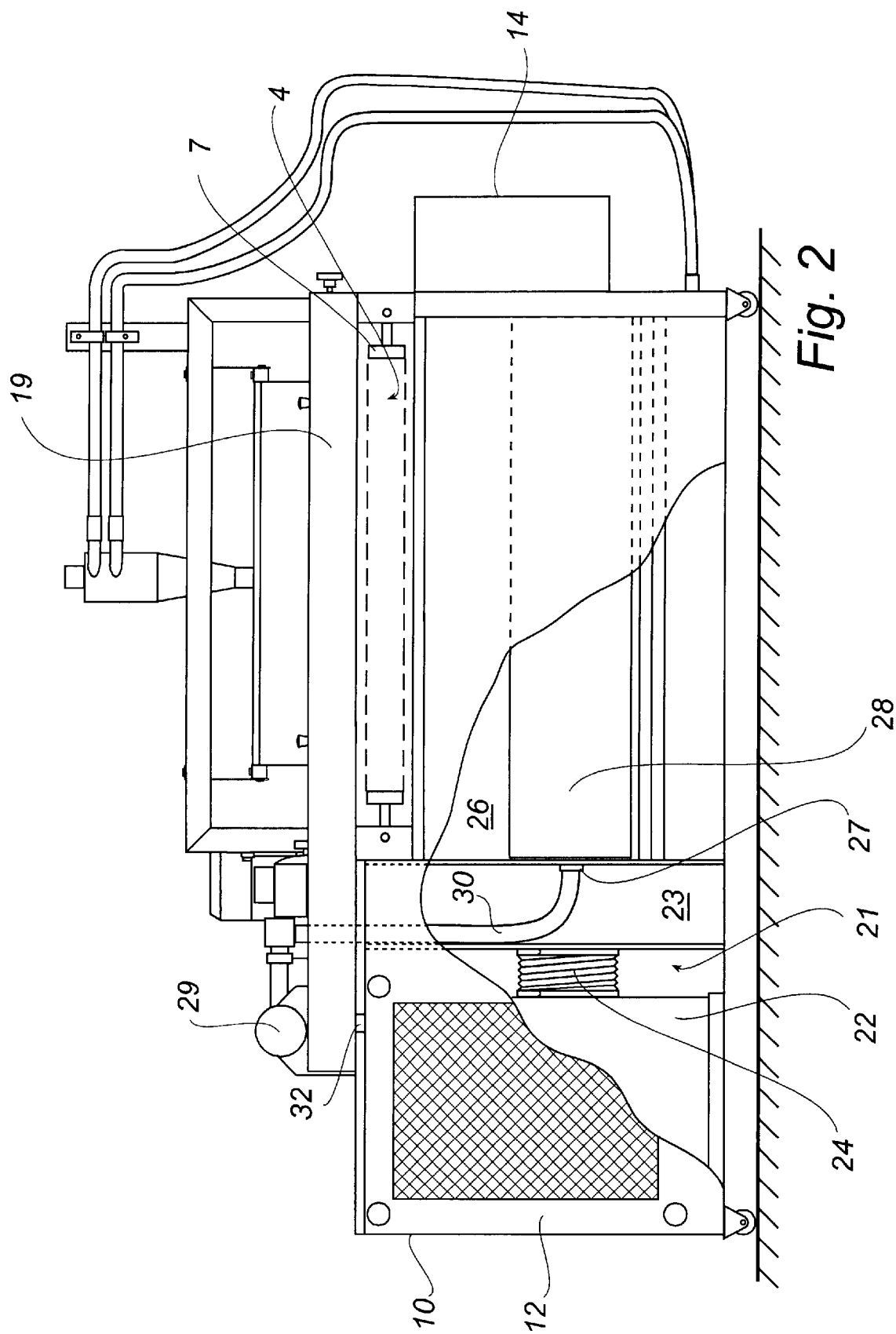
FIG. 2 is a plane view of the machine from direction I in FIG. 1.

In FIG. 2 the machine 1 is shown from the downstream side, with the side of the machine partly removed. Behind the cover 12, inside the housing 10, is revealed the suction device, comprising a fan 22, sucking air from an adjacent chamber 23 through a protective boot 24. The chamber 23 is connected to a second, larger chamber 26, being situated immediately underneath the moving conveyer 4. In the chamber 26 is fitted a filter 28, extending across the entire width of the chamber 26, in order to prevent powder particles from leaving the chamber 26 and also evenly distribute the under pressure in the chamber 26. The chamber 26 is open towards the conveyor 4, and any air sucked out through the filter 28 is drawn from this opening.

According to the illustrated embodiment of the invention, the filter 28 is connected to a high-pressure compression tank 29 through an air pipe 30 and a connector 27. The compression tank is arranged to regularly clean the filter 28 with a thrust of air, and is controlled by the electronic controller 14 in way that will be described more in detail below.

The housing 10, where the fan 22 is situated, is connected to the box 19 of the air-knife 8 through a passage 32. Through this passage 32 any over pressure arising in the housing 10 is directed into the box 19, and through the slit 20. In the illustrated example, this passage 32 is formed as an opening in the housing wall, the box 19 being fitted covering this opening. Other solutions, such as providing an air hose or the like, is equally satisfactory.

Figure 3:
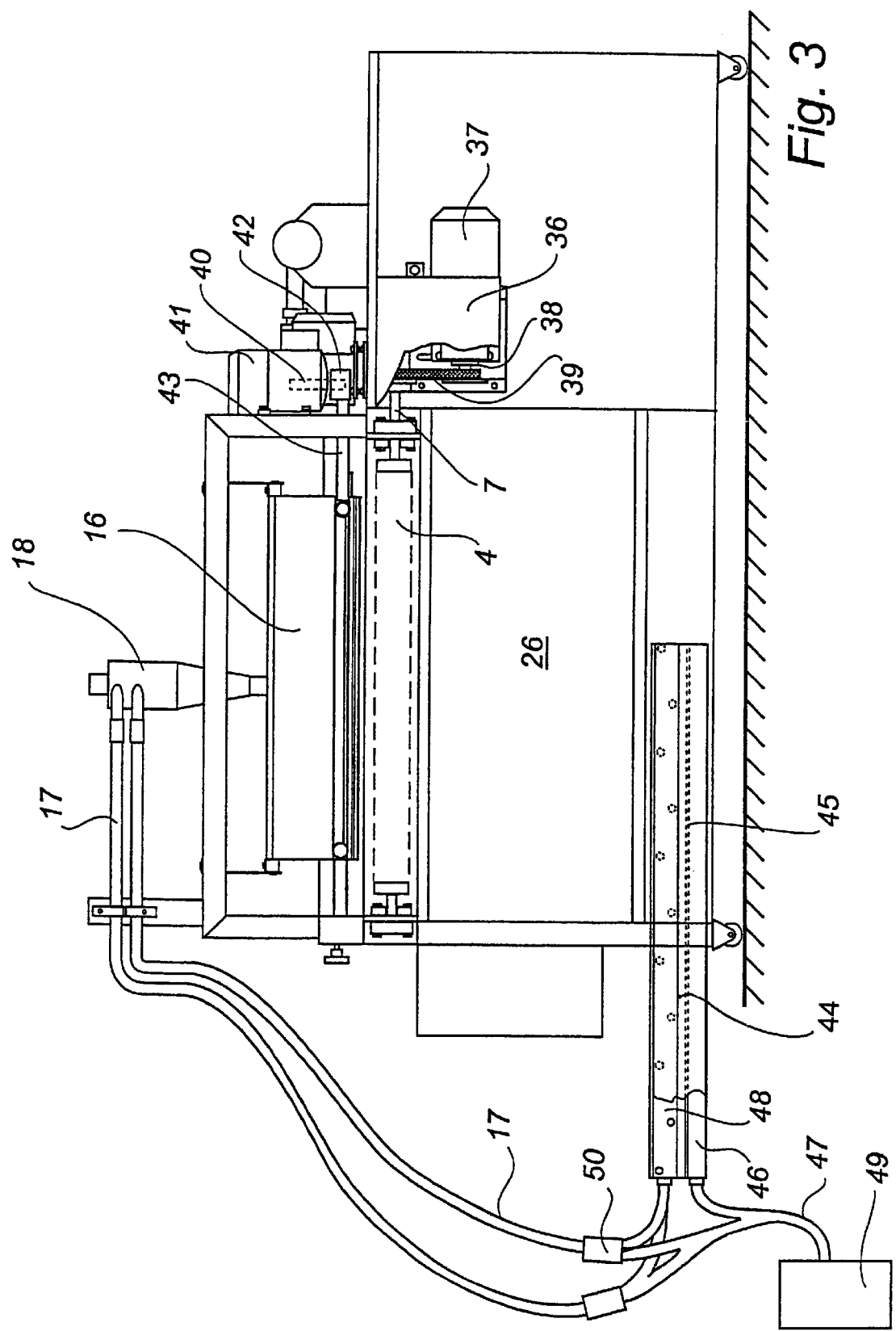
FIG. 3 is a plane view of the machine from direction II in FIG. 1.

In FIG. 3, the machine is shown from the opposite direction compared to in FIG. 2, that is, from the upstream direction.

Behind a protective cover 36 is fitted an electric motor 37, which is arranged to drive the conveyor 4 with a speed of between 0 and 30 meters per minute. In the illustrated example, the drive shaft 38 of the motor 37 is connected to the bar 7 of the conveyor with a belt 39.

Above the conveyor drive 37, 38, 39 is fitted the arrangement for vibration of the hopper 16, mentioned above. A second shaft 40, driven by a second electric motor 41, is provided with an eccentric body 42. This body is in turn connected to the hopper 16 with a shaft 43, describing a reciprocal motion as the shaft 40 is rotated. Other ways to accomplish this vibrating motion are through a pneumatic cylinder with short piston stroke, or an electromagnet connected to an AC-voltage supply.

Below the chamber 26 is arranged a powder collector in the form of a removable container 44. The dimensions of the container correspond to the bottom of the chamber 26, and preferably the chamber is tapered towards the bottom, so that the container 44 extends under the whole width of the machine, but only along a portion of its length. This elongate container 44 is arranged to be extractable to the side of the machine 1, thereby enabling an operator to empty it.

In the preferred embodiment the container 44 is provided with a horizontal partition bottom 45, dividing the container into two chambers 46, 48. The partition bottom is made of a sintered material that is permeable to air, but without letting powder particles pass through. To the lower chamber 46, means such as air tubes 47 are attached for supplying air under pressure from a source 49. To the upper chamber 48 are attached the tubes 17 leading to the cyclone 18 of the powder applying device 6. The tubes 17 are preferably arranged to extend different distances into the container. The tubes 17 are provided with ejector means 50 being connected to the pressure air supply, thereby creating a flow in the tubes 17 towards the cyclone 18.

Figure 4:
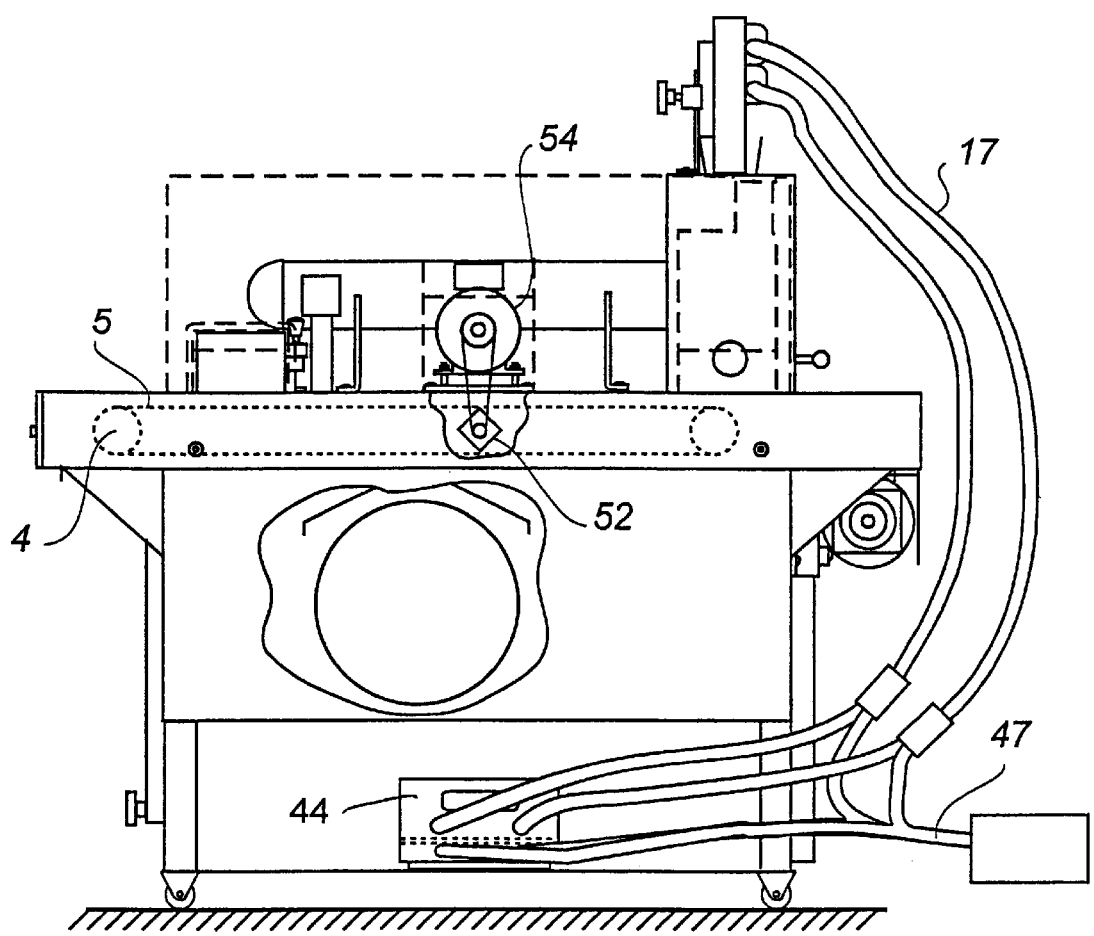
FIG. 4 is a side view of the machine from direction III in FIG. 1.

In FIG. 4 the machine is shown from the side, giving a better view of where the connections of the tubes 17, 47 are made with the container 44. In FIG. 4 is also shown a square section bar 52, being rotably arranged across the conveyor 4, between the upper and lower runs of the belt 5. The upper side of the bar is in contact with the upper run of the belt 5, which rests on the bar. An electric motor 54 is arranged to rotate the bar 52.

In the following, the function of the machine with the device according to the present invention will be described.

A base sheet 61 with transfers 62 printed thereon enters the machine on the upstream side, and is conveyed by a conveyor 4 in the direction A. The sheet 61 is conveyed beneath the powder-applying device 6, which applies an adhesive powder, preferably a synthetic powder preferably a polymer such as polyamide, polyester or the like, onto the base sheet 61. The transfers 62 are still tacky from the screen printing operation performed in the preceding step and the powder thus sticks to these areas.

As the sheet 61 is conveyed by the conveyor 4, it is pulled downwards against the upper surface of the belt 5 by the under-pressure created in the chamber 26 by the suction device 22. The sheet is gradually moved under the air-knife 8, which directs a jet of air extending across the width of the conveyer onto the sheet. This jet of air effectively removes powder from any area of the sheet that is not coated with tacky paint, and excess powder from the transfers themselves, leaving only an adequate layer of adhesive powder on the transfers 62. As the sheet is conveyed, the square section bar 52 is rotated, moving the upper run of the belt 5 up and down. This creates a shaking motion of the belt 5, which is helpful in removing the excess powder. The sheet is then conveyed to the subsequent printing line step, which is not shown in the drawings.

The excess powder thus removed is sucked down through the belt into the chamber 26 by the under-pressure, and proceeds down into the container 44 at the bottom of the chamber 26. In the container 44, the powder is kept in continuous motion by the air emanating through the sintered partition bottom 45. Being prevented from settling down onto the bottom of the container 44, the powder is readily sucked into the tubes 17, extending into the container 44. The tubes 17 transport the powder back to the cyclone, where it can be reused.

The air that is sucked out from the chamber 26 by the suction device 22 escapes through the outlet 11, but according to the preferred embodiment the silencer and filter fitted in the outlet 11 create a pressure gradient, resulting in a slight over-pressure in the housing 10. It is this over pressure that is used to create the air jet of the air-knife.

As the filter 28, between the chamber 26 and the chamber 23 is clogged with powder particles, the mentioned pressure gradient decreases, and it is therefore important to keep the filter 28 free from powder. This is accomplished by the high pressure compressor 29, which is controlled by the controller 14 to release thrusts of air, which are guided through the tube 30 to the filter 28, hereby effectively clearing the filter from particles. This process is repeated for example every 20 seconds.

The invention has been described in connection to a preferred embodiment being focused on screen transfer printing. It is clear to a person skilled in the art that this embodiment does not limit the scope of the appended claims, but only serves as an example in a specific application.

For example, as is clear from the object of the invention, it is possible to implement the device and method of removing coating powder in offset printing, without departing from the scope of the claims.

What is claimed is:

1. Device for application of coating powder in a process, comprising
    a conveyor with an air permeable conveyor surface for conveying a base sheet in a direction of travel, said base sheet being coated with at least one layer upstream said conveyor,
    a powder-applying device, arranged to apply coating powder onto said base sheet,
    means for directing a jet of air towards said base sheet arranged downstream said powder applying device such that said jet of air effectively removes any excess coating powder from said base sheet, and
    a suction device arranged to create an under-pressure beneath said conveyor surface, causing said base sheet to be pulled towards said conveyor surface, and forcing said excess coating powder to pass through said conveyor surface,
    wherein said means for directing a jet of air is connected in fluid communication with said suction device, which receives air that has been removed from beneath said conveyor surface.

2. Device according to claim 1, wherein said conveyor is a belt conveyor having a belt, the belt being made of a latticed material.

3. Device according to claim 2, wherein said belt is a net.

4. Device according to claim 1, further comprising a chamber beneath said conveyor, said suction device being arranged to provide an under-pressure in said chamber.

5. Device according to claim 4, wherein said suction device is connected to said chamber via a filter.

6. Device according to claim 5, wherein said chamber is provided with a powder collecting container, arranged to collect any excess coating powder present in the chamber.

7. Device according to claim 6, further comprising a passage connecting said powder collecting container to said powder-applying device, for enabling transportation of excess powder collected in said container back to said powder applying device.

8. Device according to claim 1, wherein said means for directing a jet of air includes an air knife.

9. Device according to claim 8, wherein said air knife includes a manual adjustment mechanism.

10. Device according to claim 1, wherein said means for directing a jet of air directs said jet of air transverse to the direction of travel of said conveyer.

11. Device for application of adhesive powder in a screen transfer printing process, comprising
- a conveyor with an air permeable conveyor surface for conveying a base sheet in a direction of travel, said base sheet being coated with at least one layer upstream said conveyor,
- a powder-applying device, arranged to apply adhesive powder onto the base sheet being conveyed by the conveyor,
- means for directing a jet of air towards the base sheet arranged downstream said powder-applying device, said jet of air effectively removing any excess adhesive powder from the base sheet, and
- a suction means arranged to create an under-pressure beneath said conveyor, causing the base sheet to be pulled towards said conveyor, and forcing excess adhesive powder through said conveyor surface,
- wherein said means for directing a jet of air is connected in fluid communication with said suction means, which receives air that has been removed from beneath said conveyor surface.

12. Device according to claim 11, wherein said conveyor surface comprises a belt and excess adhesive powder is drawn through said belt.

13. Device according to claim 11, wherein said means for directing a jet of air directs said jet of air transverse to the direction of travel of said conveyer.

14. Method for application of coating powder in a screen or offset printing process, comprising the steps of:
- applying coating powder onto a base sheet, previously at least partly coated with at least one coating layer,
- applying a flow of air towards said base sheet, thereby removing excess coating powder, and
- applying under-pressure beneath a surface supporting said base sheet, thereby retaining said base sheet to the surface and forcing excess powder through said surface,
- wherein said step of applying under-pressure removes air from beneath said conveyor surface, and the air thereby removed is used to form the flow of air applied towards the base sheet.

15. Method according to claim 14, wherein said excess powder is recycled and reused.

16. Method according to claim 14, wherein said step of applying a flow of air includes directing air through at least one opening in an air knife.

* * * * *